US012143056B2

(12) United States Patent
Kotikelapudi et al.

(10) Patent No.: US 12,143,056 B2
(45) Date of Patent: Nov. 12, 2024

(54) CURRENT REGULATION FOR STEPPER MOTORS USING DUAL LOOP CONTROL THROUGH VOLTAGE MODE AND CURRENT MODE

(71) Applicant: TEXAS INSTRUMENTS INCORPORATED, Dallas, TX (US)

(72) Inventors: Venkata Naresh Kotikelapudi, Bangalore (IN); J Divyasree, Bangalore (IN); Ganapathi Shankar Krishnamurthy, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/463,264

(22) Filed: Aug. 31, 2021

(65) Prior Publication Data

US 2023/0067632 A1 Mar. 2, 2023

(51) Int. Cl.
*H02P 8/12* (2006.01)
*H02P 8/34* (2006.01)

(52) U.S. Cl.
CPC . *H02P 8/12* (2013.01); *H02P 8/34* (2013.01)

(58) Field of Classification Search
CPC ..................................... H02P 8/12; H02P 8/34
See application file for complete search history.

(56) References Cited

U.S. PATENT DOCUMENTS

| 4,336,484 A * | 6/1982 | Marinko | H02P 8/22 318/432 |
| 4,383,209 A * | 5/1983 | Lewis | G11B 21/081 318/696 |
| 5,075,608 A * | 12/1991 | Erdman | F25B 49/025 318/599 |
| 6,236,174 B1 * | 5/2001 | White | H02P 6/182 318/811 |
| 6,539,484 B1 * | 3/2003 | Cruz | G06F 1/26 307/42 |
| 6,865,458 B1 * | 3/2005 | Kim | B60R 16/0315 701/32.7 |
| 7,466,089 B2 * | 12/2008 | Beifus | H02P 6/28 318/400.26 |

(Continued)

*Primary Examiner* — Rina I Duda
(74) *Attorney, Agent, or Firm* — Valerie M. Davis; Frank D. Cimino

(57) ABSTRACT

A stepper motor controller includes a first error amplifier, a second error amplifier, and a comparator. The first error amplifier has a first input adapted to be coupled to a current sensor to receive a sensed drive current, a second input adapted to receive an expected drive current and an output to provide a first error signal based on a comparison of the sensed drive current and the expected drive current. The second error amplifier has a first input adapted to be coupled to a voltage sensor to receive a sensed drive voltage, a second input coupled to the output of the first error amplifier and an output to provide a second error signal based on a comparison of the sensed drive voltage and the first error signal. The comparator has a first input adapted to receive a reference signal, a second input coupled to the output of the second error amplifier and an output to provide a stepper motor control signal based on a comparison of the reference signal and the error signal.

20 Claims, 5 Drawing Sheets

(56) References Cited

U.S. PATENT DOCUMENTS

| | | | | |
|---|---|---|---|---|
| 8,222,846 | B2* | 7/2012 | Sugie | H02P 6/085 |
| | | | | 318/400.29 |
| 9,225,276 | B2* | 12/2015 | You | H02P 8/34 |
| 2002/0105293 | A1* | 8/2002 | Harlan | H02P 6/10 |
| | | | | 318/400.04 |
| 2005/0146219 | A1* | 7/2005 | Pincu | G06F 1/263 |
| | | | | 307/18 |
| 2008/0265825 | A1* | 10/2008 | Su | H03F 3/2175 |
| | | | | 318/135 |
| 2011/0181215 | A1* | 7/2011 | Nakagawara | H02P 6/20 |
| | | | | 318/400.11 |
| 2013/0166947 | A1* | 6/2013 | Yang | H02M 3/156 |
| | | | | 714/E11.054 |
| 2015/0326158 | A1* | 11/2015 | Furlan | H02P 8/34 |
| | | | | 318/685 |
| 2016/0043680 | A1* | 2/2016 | Ninomiya | H02P 25/034 |
| | | | | 359/557 |
| 2017/0079088 | A1* | 3/2017 | Dahlqvist | H04N 23/695 |
| 2017/0276900 | A1* | 9/2017 | Nishinouchi | H02P 7/025 |
| 2018/0115268 | A1* | 4/2018 | Li | H02P 7/04 |

* cited by examiner

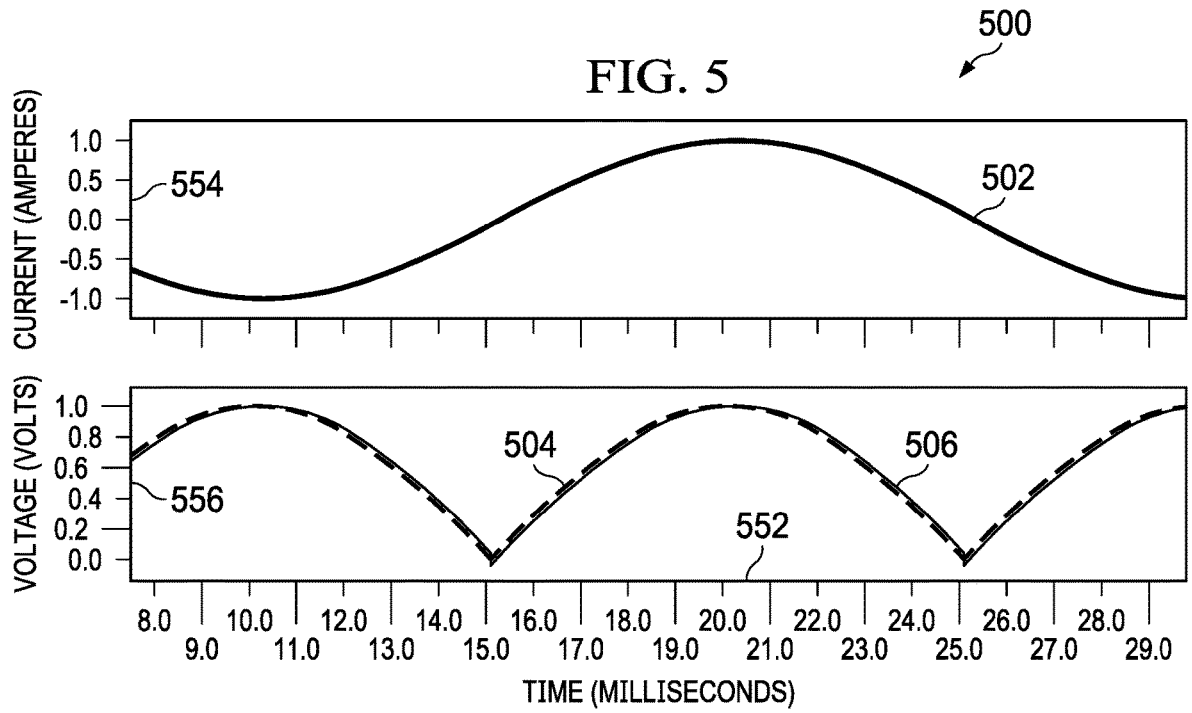
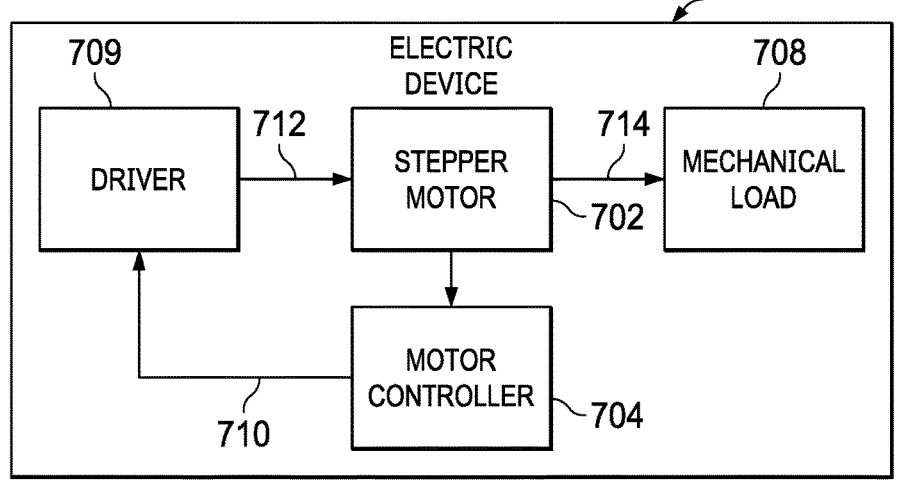

CURRENT REGULATION FOR STEPPER MOTORS USING DUAL LOOP CONTROL THROUGH VOLTAGE MODE AND CURRENT MODE

BACKGROUND

A stepper motor includes a rotor and a stator and converts electrical energy into mechanical energy (e.g. rotational force). A position of the rotor can be held in a constant position by sending a current waveform having a constant amplitude to the stepper motor. The position of the rotor can be rotated by sending a current waveform having a variable amplitude to the stepper motor (e.g., a current waveform having a sinusoidal amplitude can be sent to the stepper motor to rotate the rotor). The current waveform sent to the stepper motor can be generated by controlling a voltage applied to the stepper motor (e.g., a voltage applied to a pair of poles of the stator). For instance, the stepper motor may be a unipolar stepper motor having a single pair of poles, or the stepper motor may be a bipolar stepper motor having two pairs of poles. Each pair of poles may have metal-oxide-semiconductor field-effect transistors (MOSFETs) that receive pulse-width modulation (PWM) signals from a driver to control the voltage applied to the pair of poles to generate the current waveform.

SUMMARY

In accordance with at least one example of the disclosure, a stepper motor controller includes a first error amplifier, a second error amplifier, and a comparator. The first error amplifier has a first input adapted to be coupled to a current sensor to receive a sensed drive current, a second input adapted to receive an expected drive current and an output to provide a first error signal based on a comparison of the sensed drive current and the expected drive current. The second error amplifier has a first input adapted to be coupled to a voltage sensor to receive a sensed drive voltage, a second input coupled to the output of the first error amplifier and an output to provide a second error signal based on a comparison of the sensed drive voltage and the first error signal. The comparator has a first input adapted to receive a reference signal, a second input coupled to the output of the second error amplifier and an output to provide a stepper motor control signal based on a comparison of the reference signal and the error signal.

In accordance with another example of the disclosure, a stepper motor system includes a stepper motor, a voltage sensor coupled to the stepper motor, a current sensor coupled to the stepper motor, a controller coupled to the stepper motor, the voltage sensor, and the current sensor, and a driver coupled to the controller and the stepper motor. The controller is configured to generate a control signal for the stepper motor based on a first error signal produced from a voltage measurement from the voltage sensor and a second error signal produced from a current measurement from the current sensor. The driver is configured to control a voltage applied to the stepper motor based on the control signal.

In accordance with yet another example of the disclosure, a stepper motor controller includes a function generator configured to generate a sawtooth function signal and a comparator coupled to the function generator. The comparator is configured to receive the sawtooth function signal, receive an error signal based on a current measurement and a voltage measurement from a stepper motor, compare the sawtooth function signal and the error signal, generate a PWM signal based on comparing the sawtooth function signal and the error signal, and drive a stepper motor driver using the PWM signal.

BRIEF DESCRIPTION OF THE DRAWINGS

For a detailed description of various examples, reference will now be made to the accompanying drawings in which:

FIG. 5 is a graph of simulation results of a current across a coil of a stepper motor, an actual waveform of the current across the coil of the stepper motor, and an expected waveform of the current across the coil of the stepper motor in accordance with various examples.

FIG. 7 is a schematic block diagram of an electric device with a stepper motor in accordance with various examples.

The same reference numbers or other reference designators are used in the drawings to designate the same or similar (functionally and/or structurally) features.

DETAILED DESCRIPTION

Figure 1:
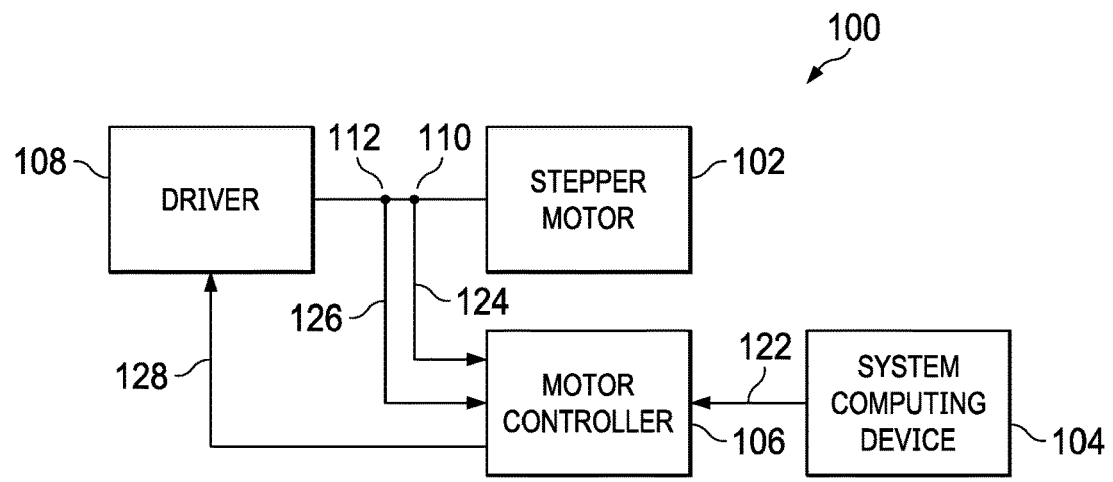
FIG. 1 is a schematic block diagram of a system for current regulation of a stepper motor using dual loop control through a voltage mode and a current mode in accordance with various examples.

Stepper motors may be used in a variety of different application settings such as, but not limited to, two-dimensional or three-dimensional printing, medical applications, drones, gimbles, tools, industrial systems and textile manufacturing. However, stepper motors commonly generate undesirable audio noise. The audio noise may include magnetic noise, mechanical noise, and/or electrical noise. The magnetic noise may be generated by magnetostriction, which causes ferromagnetic materials to expand or contract in response to a magnetic field. The mechanical noise may be generated by vibrations and resonant frequencies from physical components of the stepper motors. The electrical noise may be generated by jitter in the voltage waveform applied to the poles of the stator and by changes in switching frequencies in the current waveform used to rotate the rotor. In conventional stepper motor control solutions, a current sensor measures the instantaneous current being drawn by the stator (e.g. current running through different windings wrapped around different portions of the stator), and a motor controller uses the instantaneous current to switch the MOSFETs controlling the voltage applied to the stator (e.g. voltages applied to different windings wrapped around different portions of the stator). However, these conventional stepper motor control solutions react to inaccuracies in the system, which causes unnecessary noise from the jitter in the voltage waveform applied to the poles of the stator and by the switching frequencies in the current waveform used to rotate the rotor.

Disclosed herein are examples of a system and a method for current regulation for stepper motors using dual loop control through voltage mode and current mode. One or more current sensors measure the instantaneous current being drawn by the stator, and one or more voltage sensors measure the instantaneous voltage applied to the poles of the stator. A motor controller uses both the instantaneous current and the instantaneous voltage measurements to generate a control signal to control the stepper motor. By using both the instantaneous current and the instantaneous voltage measurements, the dual loop control is able to reduce audio noise of the stepper motor. For instance, the stepper motor is able to reduce audio noise caused by jitter in the waveform applied to the poles of the stator (e.g. the one or more the windings wrapped around one or more portions of the stator) and by the switching frequencies in the current waveform used to rotate the rotor. In some examples, a motor controller includes a first error amplifier and a second error amplifier. The first error amplifier receives a signal representing the instantaneous current measurement and compares it to a representation of an expected current signal to generate a first error signal. The second error amplifier receives a signal representing the instantaneous voltage measurement and compares it to the first error signal or a signal based on the first error signal to generate a second error signal. The second error signal is used by the motor controller to generate a control signal to control the stepper motor.

FIG. 1 is a schematic block diagram of a system 100 for current regulation for a stepper motor 102 using dual loop control through voltage mode and current mode in accordance with various examples. The system 100 may be used in any setting or application that uses the stepper motor 102. The system 100 includes the stepper motor 102, a system computing device 104, a motor controller 106, a driver 108, one or more current sensors 110, and one or more voltage sensors 112. While illustrated as a single conductor between driver 108 and stepper motor 102 in this example embodiment, multiple conductors (each of which may be coupled to a voltage sensor and/or a current sensor) may be utilized to connect driver 108 to stepper motor 102.

The system computing device 104 determines a motor requirement (e.g., a position or speed of the stepper motor 102). For instance, if the stepper motor 102 is being used in a robotic arm positioning application, a position or speed of the stepper motor 102 can be input by a user. If the stepper motor 102 is being used in a printing application, a position or speed of the stepper motor 102 can be determined by the position or speed of the stepper motor 102 to produce the desired printing. However, the motor requirement may be generated or obtained in any manner.

The system computing device 104 sends instruction signaling 122 that includes the motor requirement to the motor controller 106. The motor controller 106 receives the instructions 122 and also receives a current measurement 124 (e.g., an instantaneous current measurement) from the one or more current sensors 110 and a voltage measurement 126 (e.g., an instantaneous voltage measurement) from the one or more voltage sensors 112. The one or more current sensors 110 may optionally include an ammeter connected in series between the driver 108 and the stepper motor 102, and the voltage sensor 112 may optionally include a voltmeter connected in parallel across the stepper motor 102 (e.g., across a coil of the stator of the stepper motor 102 (e.g., a stator coil)). The current measurement 124 represents the current being drawn by the stepper motor 102. For instance, the current measurement 124 may represent the current being drawn by one or more of the coils/windings of the stator of the stepper motor 102. The voltage measurement 126 represents the voltage being applied to the stepper motor 102. For instance, the voltage measurement 126 may represent the voltage being applied to one or more of the coils/windings of the stator of the stepper motor 102. The motor controller 106 uses the instructions 122, the current measurement 124, and the voltage measurement 126 to generate a control signal 128. The control signal 128 may include a PWM signal needed to generate a voltage waveform applied to the stepper motor 102 to produce a desired current.

The driver 108 receives the control signal 128. The driver 108 may be an integrated driver (e.g. a driver integrated as a single device, which may also be integrated with one or more components of the motor controller 106 and/or the system computing device 104) or a combination of a pre-driver and a MOSFET circuit (e.g. a device where the MOSFETs are integrated on a separate semiconductor substrate). The integrated driver optionally includes logic, a gate driver, MOSFETs, and protection and current control circuitry integrated into one device (e.g. one semiconductor substrate and/or one semiconductor package). The combination of the pre-driver and the MOSFET circuit separates the components into the pre-driver including the logic, the gate driver, and the protection and current control circuitry into one device (e.g. one semiconductor substrate and/or one semiconductor package) and the MOSFETs into the MOSFET circuit (e.g. one semiconductor substrate and/or one semiconductor package). However, examples may include any type of driver 108. The driver 108 uses the control signal 128 to switch the individual MOSFETs that control the voltage applied to the stepper motor 102. For instance, when the control signal 128 is a PWM signal, the driver 108 uses the PWM signal to switch the MOSFETs on (conducting) and off (non-conducting) to create a voltage waveform across the stepper motor 102 corresponding to the PWM signal. The voltage waveform across the stepper motor 102 is measured by the one or more voltage sensors 112, and the voltage measurement 126 is provided to the motor controller 106. The current waveform drawn by the stepper motor 102 is measured by the one or more current sensors 110 and is provided to the motor controller 106 as the current measurement 124.

Figure 2:
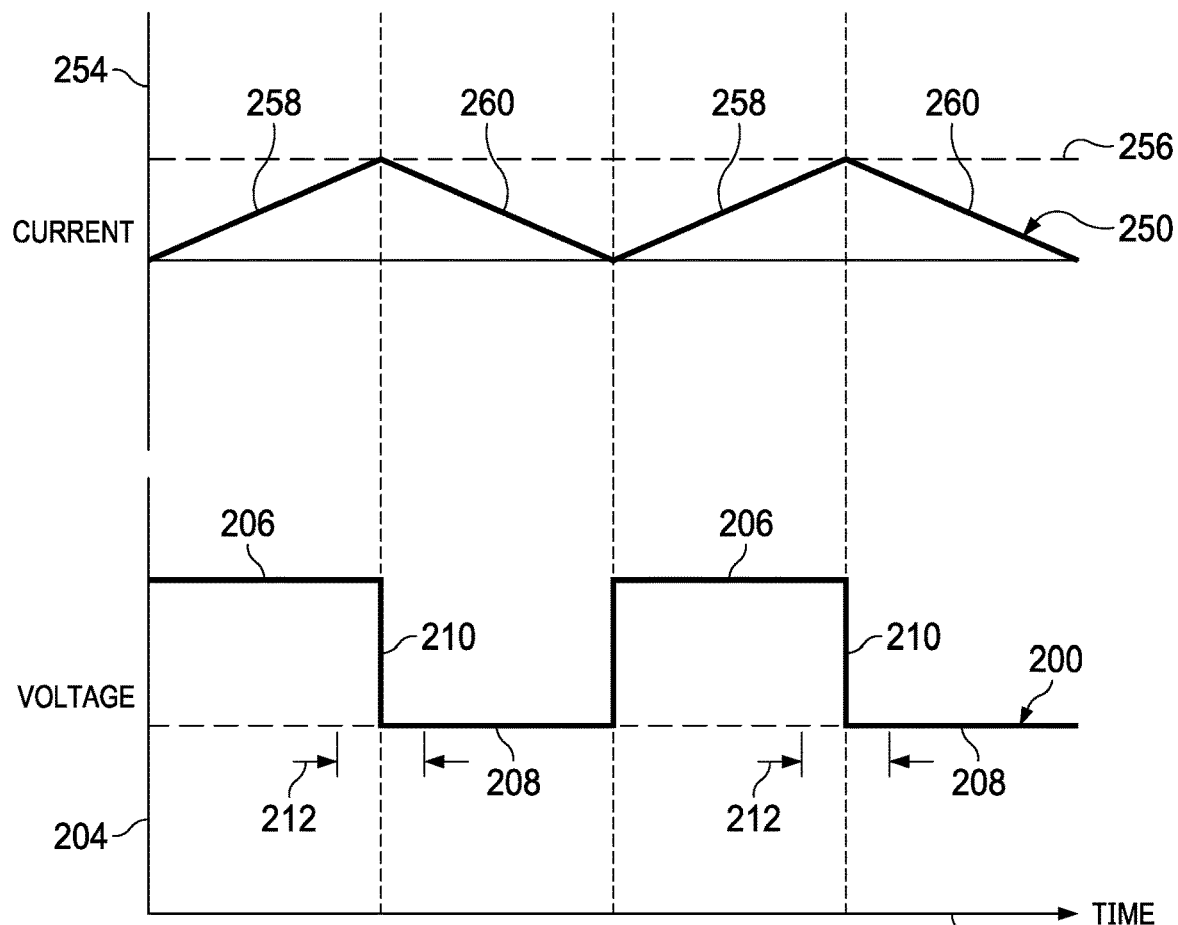
FIG. 2 is a graph of a voltage waveform and a current waveform of a stepper motor in a holding state in accordance with various examples.

FIG. 2 is a graph of a voltage waveform 200 and a current waveform 250 of a stepper motor in a holding state (e.g., when maintaining a position of the rotor at a constant position) in accordance with various examples. In some examples, PWM is used to control an average value of the voltage provided to the stepper motor, which causes the stepper motor to be in a holding state. The horizontal axis or the x-axis 202 represents time. The bottom vertical axis or the bottom y-axis 204 represents a voltage (such as the voltage applied across one or more of the coils/windings of the stator) of the voltage waveform 200, and the top vertical axis or the top y-axis 254 represents a current (such as the current applied to one or more of the coils/windings of the stator) of current waveform 250. In some examples, the stepper motor has a target current value 256 that is needed to maintain the rotor at the constant position. For instance, the stepper motor may draw a current at or approximately at the target current value 256 to maintain the constant position. The value of the target current value 256 can be any value and is based on the desired holding position of the rotor.

In order to produce the current waveform 250 that approximates the target current value 256, the voltage waveform 200 is applied to the stepper motor. The voltage waveform 200 alternatives between a maximum voltage (Vm) (e.g., at sections 206 of the voltage waveform 200) and a minimum voltage (e.g., approximately 0 volts or ground) (e.g., at sections 208 of the voltage waveform 200). While the voltage waveform 200 is at the value Vm at sections 206, the current waveform 250 increases during drive periods (e.g., at sections 258 of the current waveform 250). While the voltage waveform 200 is at no voltage, the current waveform 250 decreases during slow decay periods (e.g., at sections 260 of the current waveform 250).

FIG. 2 also shows that the voltage waveform 200 includes a falling edge 210 where the voltage waveform 200 decreases from the Vm to approximately 0 volts and that the voltage waveform 200 includes a jitter band 212. The jitter band 212 represents that the falling edge 210 has a range of time values where the falling edge 210 may occur. For instance, the falling edge 210 may occur earlier or later within the voltage waveform 200. This variation in the timing of the falling edge 210 causes audio noise from jitter. In some examples, the current regulation using dual loop control through voltage mode and current mode described in this disclosure reduces the variation in the timing of the falling edge 210 and reduces the jitter band 212, and reduces audio noise of the stepper motor while in a holding position.

Figure 3:
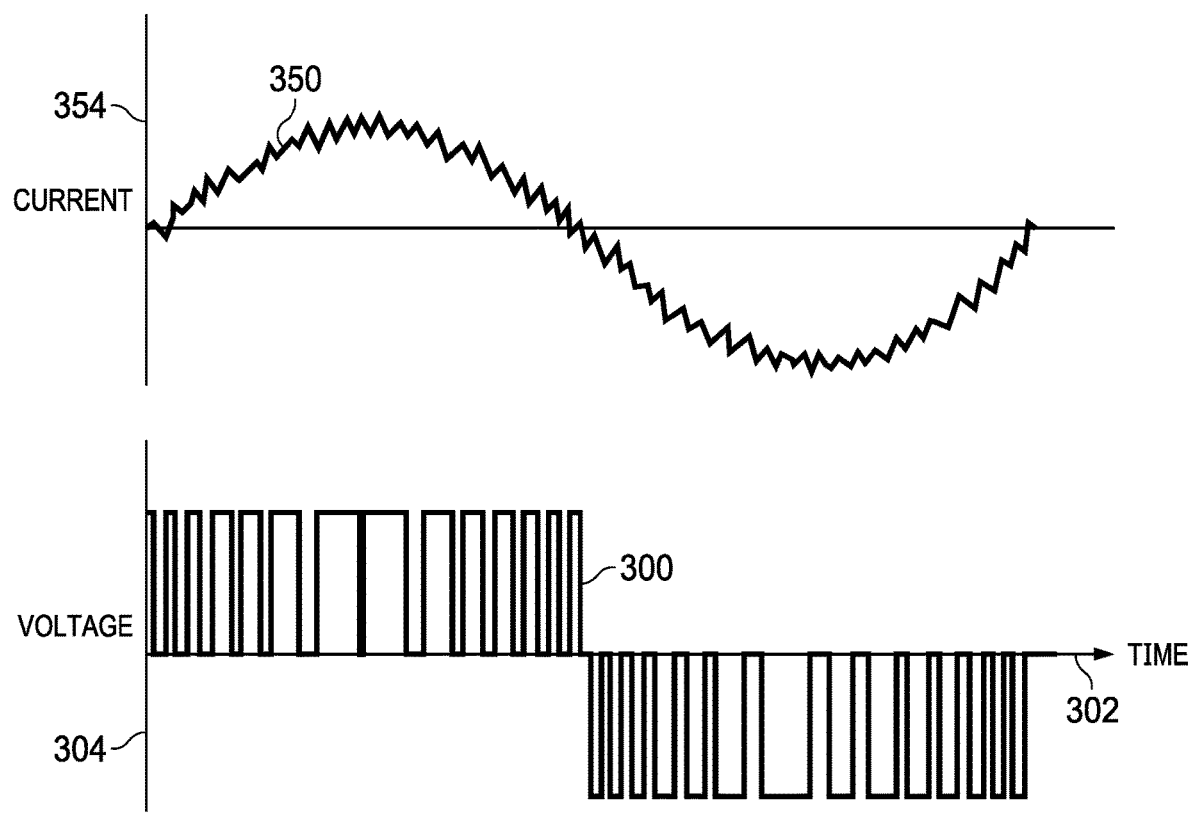
FIG. 3 is a graph of a voltage waveform and a current waveform of a stepper motor in a rotating state in accordance with various examples.

FIG. 3 is a graph of a voltage waveform 300 and a current waveform 350 of a stepper motor in a rotating state (e.g., when the rotor of the stepper motor is rotating) in accordance with various examples. The horizontal axis or the x-axis 302 represents time. The bottom vertical axis or the bottom y-axis 304 represents a voltage (such as the voltage applied to one or more of the coils/windings of the stator) of the voltage waveform 300, and the top vertical axis or the top y-axis 354 represents a current (such as the current applied to one or more of the coils/windings of the stator) of current waveform 350. To maintain a constant rotational speed, the current drawn by the stepper motor should be a smooth sinusoidal wave. As the rotational speed increases, the frequency of the sinusoidal wave is increased. As the rotational speed decreases, the frequency of the sinusoidal wave is decreased.

In order to produce the current waveform 350 that approximates the sinusoidal wave, the voltage waveform 300 is applied to the stepper motor. In the left portion of waveform 300, the voltage alternatives between a maximum voltage, Vm, and approximately 0 volts (e.g. ground). In the right portion of waveform 300, the voltage alternates from −Vm to approximately 0 volts. In some examples, the voltage waveform 300 is a PWM signal (whereby the width of each "high" period fluctuates but the frequency of each high/low cycle remains approximately the same). For instance, the voltage waveform 300 includes an interval or period, and the voltage waveform 300 includes a duty cycle that indicates the proportion of the interval or the period that the voltage waveform 300 is at the maximum value (e.g., the Vm). As the duty cycle of the voltage waveform 300 is decreased, the resulting current value of the current waveform 350 is decreased. As the duty cycle of the voltage waveform 300 is increased, the resulting current value of the current waveform 350 is increased. Accordingly, the voltage waveform 300 may include a PWM signal to produce the sinusoidal wave for the current waveform 350.

FIG. 3 also shows that current waveform 350 is not a smooth sinusoidal wave. Some of the current values of the current waveform 350 are above the current value needed for the smooth sinusoidal wave and some of the current values of the current waveform 350 are below the current value needed for the smooth sinusoidal wave. In other words, the actual current values may vary from the ideal current values. This deviation can be caused by mechanical or electrical limitations of the stepper motor system or by control mechanisms such as by using an instantaneous current signal to control the voltage waveform 300. In some examples, the current regulation using dual loop control through the voltage mode and the current mode reduces the variation in the voltage waveform 300 as compared to conventional solutions that control the voltage waveform 300 by using a current mode (e.g., only using an instantaneous current signal to control the voltage waveform 300). This is accomplished at least in part by using both the voltage measurement and the current measurement to control the voltage waveform 300, and this reduces audio noise of the stepper motor while the stepper motor is rotating.

Figure 4:
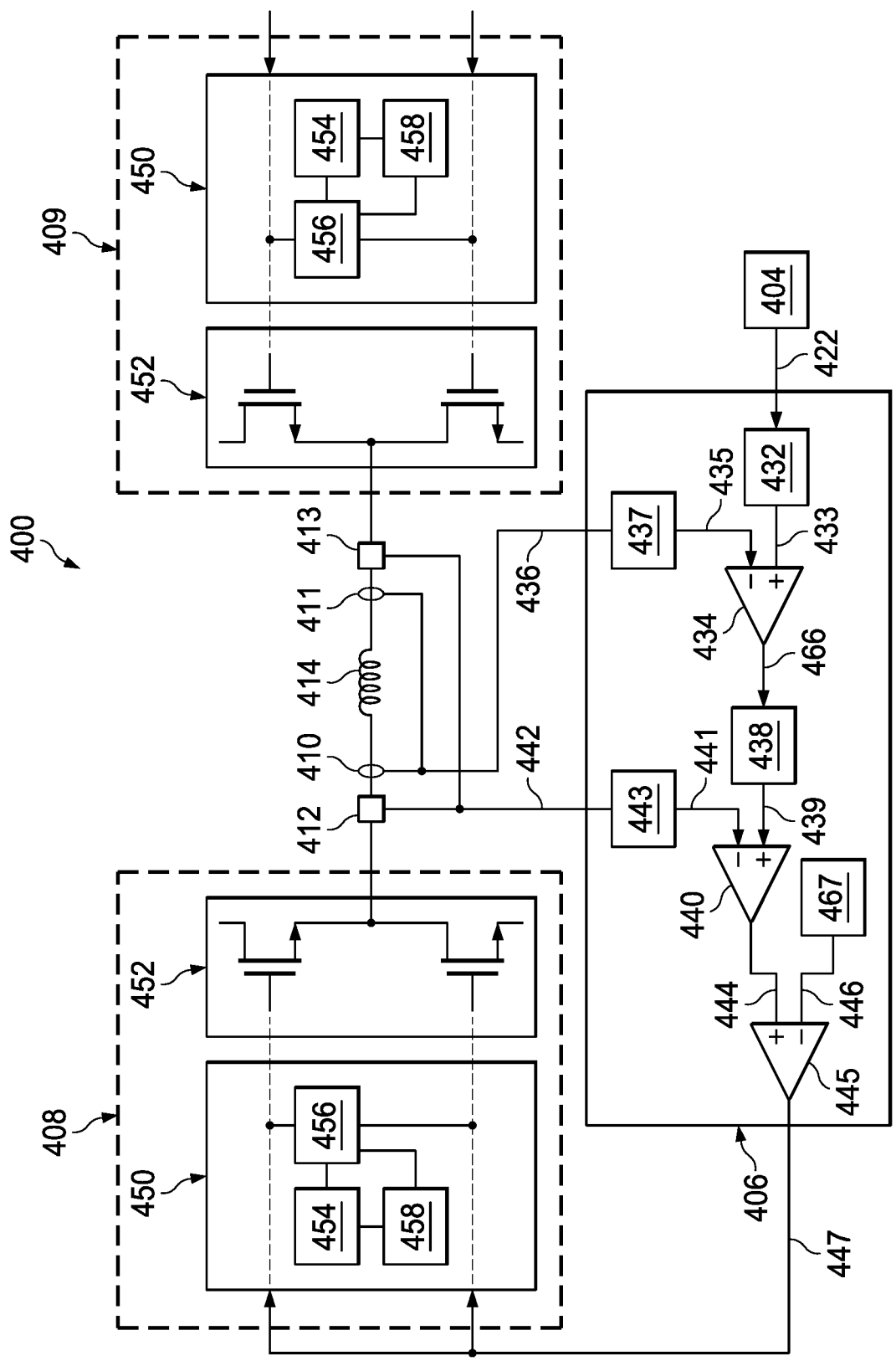
FIG. 4 is a circuit schematic diagram of a system for current regulation for a stepper motor using dual loop control through a voltage mode and a current mode in accordance with various examples.

FIG. 4 is a circuit schematic diagram of a system 400 for current regulation for a stepper motor using dual loop control through voltage mode and current mode in accordance with various examples. The system 400 may be used in any setting or application that uses the stepper motor. The system 400 may include a system computing device 404 (which may be similar to system computing device 104), a motor controller 406 (which may be similar to motor controller 106), a first driver 408 (which may be similar to motor driver 108), a second driver 409 (which may be similar to motor driver 108), a first current sensor 410 (which may be similar to current sensor 110), a second current sensor 411 (which may be similar to current sensor 110), a first voltage sensor 412 (which may be similar to voltage sensory 112), a second voltage sensor 413 (which may be similar to voltage sensor 112), and a coil of a stepper motor 414 (which may be similar to stepper motor 102 or any other single coil/winding or multi-coil/winding stepper motor).

The system computing device 404 determines a motor requirement 422 (e.g., a position or a speed of the stepper motor) and provides the motor requirement 422 to the motor controller 406 (via, for example, a serial bus or any other type of single-wire or multi-wire conductors). For instance, the motor requirement 422 can be input by a user or can be generated by the system computing device 404. However, the motor requirement 422 may be generated or obtained in any manner.

In some examples, when the system computing device 404 sends the motor requirement 422 to the motor controller 406, the motor requirement 422 is received by a digital-to-analog converter (DAC) 432. The DAC 432 uses the motor requirement 422 to generate an expected waveform 433 that corresponds to the motor requirement 422. For instance, when the motor requirement 422 indicates that a constant speed of the stepper motor is needed, the DAC 432 uses the motor requirement 422 to generate a sinusoidal waveform or a full-wave positive waveform that represents a waveform needed at the coil of the stepper motor 414 to produce the constant speed of the stepper motor. Also for instance, when the motor requirement 422 indicates that a position of the stepper motor is needed, the DAC 432 uses the motor requirement 422 to generate a constant waveform that represents a constant waveform needed at the coil of the stepper motor 414 to produce the constant position of the stepper motor. The expected waveform 433 is sent from the DAC 432 to the first error amplifier 434.

The first error amplifier 434 receives the expected waveform 433 and also receives an actual waveform 435 via current-to-voltage converter (I-to-V) 437. The actual waveform 435 is generated using a current measurement 436 collected by the first current sensor 410, the second current sensor 411, or a combination of the first current sensor 410 and the second current sensor 411. The first current sensor 410 may optionally be an ammeter connected in series between the first driver 408 and the coil of the stepper motor 414. The second current sensor 411 may optionally be an ammeter connected in series between the second driver 409 and the coil of the stepper motor 414. In some examples, the first current sensor 410 is used to measure the current being drawn by the coil of the stepper motor 414 when a positive half cycle of current is being drawn from the first driver 408, through the coil of the stepper motor 414, and to the second driver 409, and the second current sensor 411 is used to measure the current being drawn by the coil of the stepper motor 414 when a positive half cycle of the current is being drawn from the second driver 409, through the coil of the stepper motor 414, and to the first driver 408. In such a case, the current measurement 436 has a full-wave positive waveform. In other cases, when only the first current sensor 410 or the second current sensor 411 is being used to measure the current being drawn by the coil of the stepper motor 414, the current measurement 436 has a sinusoidal waveform. The current measurement 436 represents the current being drawn by the coil of the stepper motor 414. The current measurement 436 is sent to a current to voltage converter 437 in the motor controller 406.

The current to voltage converter 437 receives the current measurement 436 and converts the current measurement 436 into the voltage waveform 435. The voltage waveform 435 represents the current being drawn by the coil of the stepper motor 414 as a voltage. In some examples, the current to voltage converter 437 is a transimpedance amplifier that converts the current measurement 436 to the actual waveform 435 using one or more operational amplifiers. However, examples of current to voltage converters 437 may include any type of equipment that converts the current measurement 436 into the actual waveform 435. The current to voltage converter 437 sends the actual waveform 435 to the first error amplifier 434.

The first error amplifier 434 receives the actual waveform 435 and the expected waveform 433, compares the actual waveform 435 to the expected waveform 433, and generates a first compensating error signal 466. The first compensating error signal 466 represents an amount of error between the actual waveform 435 and the expected waveform 433. The first compensating error signal 466 is provided to a first filter 438.

The first filter 438 may be a first Pi filter and may operate as a low-pass filter, a high-pass filter, a band-pass filter, or a band-stop filter. In some examples, the first filter 438 receives the first compensating error signal 466 and filters the signal to remove instantaneous low frequency, high frequency, or a combination of low frequency and high frequency signals from the first compensating error signal 466 to generate a filtered first compensating error signal 439. The filtered first compensating error signal 439 is an input to a second error amplifier 440.

The second error amplifier 440 compares the filtered first compensating error signal 439 and the filtered voltage measurement 441. The filtered voltage measurement 441 is generated using a voltage measurement 442 collected by the first voltage sensor 412, the second voltage sensor 413, or a combination of the first voltage sensor 412 and the second voltage sensor 413. The first voltage sensor 412 and the second voltage sensor 413 may optionally be connected in parallel across the coil of the stepper motor 414. In some examples, the first voltage sensor 412 is used to measure the voltage across the coil of the stepper motor 414 when a positive half cycle of current is being drawn from the first driver 408, through the coil of the stepper motor 414, and to the second driver 409, and the second voltage sensor 413 is used to measure the voltage across the coil of the stepper motor 414 when a positive half cycle of current is being drawn from the second driver 409, through the coil of the stepper motor 414, and to the first driver 408. The voltage measurement 442 represents the voltage across the coil of the stepper motor 414. The voltage measurement 442 is input to a second filter 443.

The second filter 443 may be a second Pi filter and may operate as a low-pass filter, a high-pass filter, a band-pass filter, or a band-stop filter. In some examples, the second filter 443 filters the voltage measurement 442 to remove instantaneous low frequency, high frequency, or a combination of low frequency and high frequency signals. The output of filter 443 is filtered voltage measurement 441, which is one input to the second error amplifier 440.

The second error amplifier 440 compares the filtered voltage measurement 441 and the filtered first compensating error signal 439 and outputs a second compensating error voltage signal 444. The second compensating error voltage signal 444 represents an amount of error between the filtered voltage measurement 441 and the filtered first compensating error signal 439. The second compensating error voltage signal 444 is an input to a comparator 445.

The comparator 445 compares the second compensating error voltage signal 444 with a reference signal 446 and outputs a control signal 447. The comparator 445 may be a high-gain differential amplifier that compares the second compensating error voltage signal 444 and the reference signal 446 and outputs the control signal 447 indicating which one of the second compensating error voltage signal 444 or the reference signal 446 is larger. In some examples, the reference signal 446 may be a sawtooth signal generated by a function generator 467. A frequency of the sawtooth signal generated by the function generator 467 may be higher than an audio noise frequency range perceptible by humans to reduce audio noise in the system 400. For instance, humans may be able to perceive audio noise in the frequency range of 20 hertz to 20 kilohertz. In at least some examples, the frequency of the sawtooth signal generated by the function generator 467 is higher than 20 kilohertz to reduce audio noise in the system 400. The sawtooth signal linearly increases from approximately zero to a maximum value, and then the sawtooth signal sharply decreases from the maximum value to approximately zero. The sawtooth signal repeats this pattern and forms the reference signal 446 having the sawtooth pattern. The control signal 447 generated by the comparator 445 may be a PWM signal. For instance, the control signal 447 may include an interval or period, and the control signal 447 may include a duty cycle that indicates a proportion of the interval or the period that the control signal 447 is at the maximum value. The control signal 447 is an input to the first driver 408 and the second driver 409.

Each of the first driver 408 and the second driver 409 may receive the control signal 447 and may be an integrated driver or a combination of a pre-driver 450 and a MOSFET circuit 452 (the first driver 408 and the second driver 409 in FIG. 4 are examples of a configuration that includes the pre-driver 450 and the MOSFET circuit 452—similar to the description of driver 108, above). The integrated driver optionally includes logic, a gate driver, MOSFETs, and protection and current control integrated into one device (similar to the description of driver 108, above). The combination of the pre-driver 450 and the MOSFET circuit 452 separates the components into the pre-driver 450 that includes the logic 454, the gate driver 456, and the protection and current control 458 in one device and the MOSFETs in the MOSFET circuit 452. The logic 454 includes instructions and circuitry needed to convert the control signal 447 into switching signals to control the MOSFETs in the MOSFET circuit 452. The gate driver 456 includes circuitry needed to receive the switching signals and drive the MOSFET circuit 452 to switch the MOSFETs. The protection and current control circuitry 458 includes instructions and circuitry needed to prevent damage to components of the system 400 and control the current of the system 400. However, examples of a first driver 408 and a second driver 409 may include any type of driver and may include any components within the first driver 408 and the second driver 409.

The first driver 408 and the second driver 409 use the control signal 447 to switch the MOSFETs in the MOSFET circuits 452 to control the voltage applied to the coil of the stepper motor 414. While FIG. 4 depicts signal 447 being connected to the gates of the MOSFETs, in some embodiments signal 447 is not directly connected to these gates but is an input to one or more circuits (such as gate driver 456) and gate driver is connected to the gates of the HS-MOSFET and the LS-MOSFET. For instance, when the control signal 447 is a PWM signal, the first driver 408 and the second driver 409 use the PWM signal to switch the MOSFETs to create a voltage waveform across the coil of the stepper motor 414. The voltage waveform across the coil of the stepper motor 414 is measured by the first voltage sensor 412, the second voltage sensor 413, or a combination of the first voltage sensor 412 and the second voltage sensor 413, and the voltage measurement 442 is sent to the motor controller 406 (e.g., to the second filter 443). The current waveform drawn by the coil of the stepper motor 414 is measured by the first current sensor 410, the second current sensor 411, and the current measurement 436 is sent to the motor controller 406 (e.g., to the current to voltage converter 437). While not shown in FIG. 4, HS-MOSFET and LS-MOSFET may be configured to supply the appropriate current and/or voltage to the stepper motor 414. For example, the drain of HS-MOSFET may be connected to a higher voltage supply (e.g. a voltage supply sufficient to drive motor 414) and the source of LS-MOSFET is connected to a common potential (e.g., ground).

FIG. 5 is a graph 500 of a current 502 across a coil of a stepper motor, an actual waveform 504 of the current across the coil of the stepper motor, and an expected waveform 506 of the current across the coil of the stepper motor in accordance with various examples. For instance, the current 502 across the coil of the stepper motor corresponds to the current measurement 436 in FIG. 4. The actual waveform 504 of the current across the coil of the stepper motor corresponds to the actual waveform 435 in FIG. 4, and the expected waveform 506 corresponds to the expected waveform 433 in FIG. 4. The horizontal axis or the x-axis 552 represents time in milliseconds. The top vertical axis or the top y-axis 554 represents current in amperes, and the bottom vertical axis or the bottom y-axis 556 represents the voltage in volts.

As can be seen in FIG. 5, the current 502 across the coil of the stepper motor is a smooth sinusoidal waveform, and the actual waveform 504 of the current across the coil of the stepper motor and the expected waveform 506 of the current across the coil of the stepper motor are smooth full-wave positive waveforms. This demonstrates that the actual waveform 504 matches the expected waveform 506 and that the current regulation for the stepper motor using the dual loop control through the voltage mode and the current mode in accordance with various examples is effective in controlling the current across the coil of the stepper motor.

Figure 6:
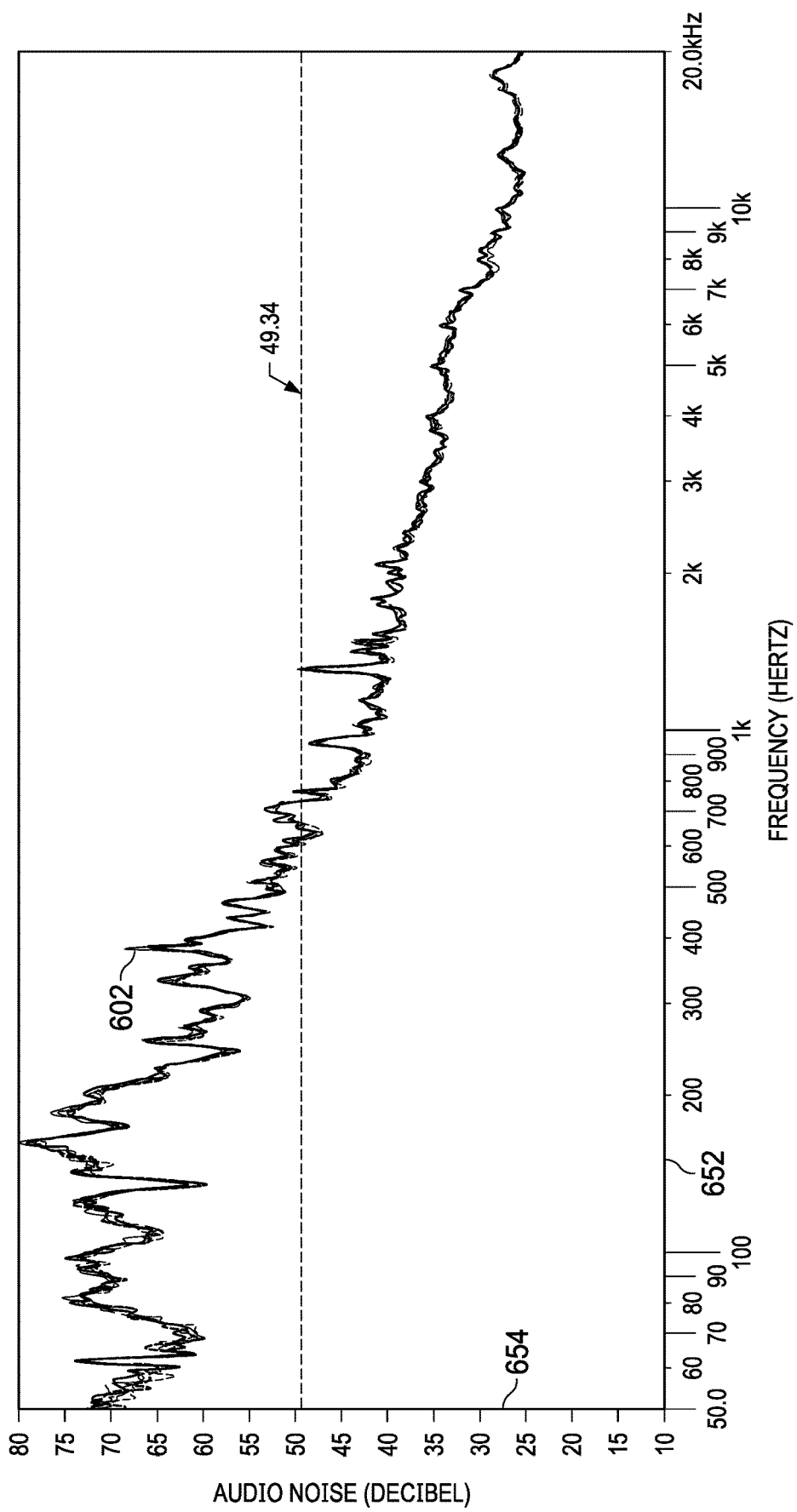
FIG. 6 is a graph of simulation results of audio noise of a stepper motor using current regulation using dual loop control through a voltage mode and a current mode in accordance with various examples.

FIG. 6 is a graph 600 of audio noise 602 of a stepper motor using current regulation using dual loop control through a voltage mode and a current mode in accordance with various examples. The horizontal axis or the x-axis 652 represents an signal frequency in hertz, and the y-axis 654 represents the magnitude of audio noise in decibels. The graphs of FIG. 6 show audio noise curves for ambient noise without a stepper motor running and for ambient noise with different stepper motors running. Specifically, the audio noise 602 includes curves for ambient noise, a 12 volt and 500 milliamp stepper motor, a 12 volt and 1 amp stepper motor, a 12 volt and 1.5 amp stepper motor, a 24 volt and 500 milliamp stepper motor, a 24 volt and 1 amp stepper motor, and a 24 volt and 1.5 amp stepper motor.

As can be seen in FIG. 6, the audio noise 602 from the stepper motors using current regulation with dual loop control through a voltage mode and a current mode is nearly identical in magnitude to ambient audio noise without any stepper motor running. In other words, the stepper motors do not add any significant audio noise to the existing ambient audio noise. In conventional solutions, the audio noise from the stepper motors using current regulation with only single loop current mode have audio noise that is greater than the ambient audio noise. Accordingly, the dual loop control may decrease audio noise generated by stepper motors.

FIG. 7 is a schematic block diagram of an electric device 700 with a stepper motor 702 in accordance with various examples. The electric device 700 includes the stepper motor 702, a motor controller 704, a driver 706, and a mechanical load 708. The electric device 700 can be an electric device in any setting or application. Some examples of electric device 700 are used in laser systems, optical systems, precision positioning systems, actuators, stages, various machinery, disk drives, printers, scanners, cameras, etc. However, examples may be used in any setting or application. The motor controller 704 generates a control signal 710 that is sent to the driver 706. The driver 706 uses the control signal 710 to generate an electrical signal 712 (e.g., an electric current or voltage signal) that is provided to the stepper motor 702 to control the stepper motor 702. The stepper motor 702 is optionally connected through a connection 714 to the mechanical load 708 that is driven by the stepper motor 702.

As shown above, some examples include a current mode control loop and a voltage mode control loop. The current mode control loop is a slower loop and includes an integrated current sense to regulate a coil current using a sinusoidal reference. The current mode control loop may help to maintain peak coil current as per a customer setting with accuracy within 5% per a channel and within 2.5% inter-channel. The current mode control loop may enable torque control and position accuracy with monotonicity of step increments. Additionally, the current control loop may provide tunable filtering settings matching step frequencies of a stepper motor and may filter out step frequency injected audio noise. The voltage mode control loop is a faster loop and includes duty detection by sensing a relevant output voltage node of an H-bridge and compares it with a voltage generated by a peak current mode loop to generate a duty reference for a fixed frequency sawtooth comparator. The voltage mode control loop avoids cycle-cycle jitter in the duty and helps with audio noise performance. Also, the voltage mode control loop filters out PWM switching frequency, responds well to changes in a motor voltage to avoid overshoots and undershoots on a coil current, and includes tunable filter settings matching to different PWM fixed frequency options. Accordingly, some examples do not require learning and adapt to changes in step frequency, motor voltages, load torque, and back electromotor force. This reduces ripple in a current coil, which further reduces audio noise and improves power savings.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component. While the use of particular transistors are described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g. NPN or PNP), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs).

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

What is claimed is:

1. A stepper motor controller comprising:
   a digital-to-analog converter (DAC) adapted to receive a stepper motor requirement and configured to generate an expected waveform;
   a first error amplifier having a first input adapted to receive a first voltage corresponding to an instantaneous current of an actual waveform, a second input adapted to receive a second voltage corresponding to a current of the expected waveform and an output to provide a first error signal based on a comparison of the first voltage and the second voltage;
   a second error amplifier having a first input adapted to receive a sensed drive voltage, a second input coupled to the output of the first error amplifier and an output to provide a second error signal based on a comparison of the sensed drive voltage and the first error signal; and
   a comparator having a first input adapted to receive a reference signal, a second input coupled to the output of the second error amplifier and an output to provide a stepper motor control signal based on a comparison of the reference signal and the second error signal.

2. The stepper motor controller of claim 1, wherein the reference signal comprises a sawtooth reference signal.

3. The stepper motor controller of claim 1, wherein a frequency of the reference signal is greater than 20 kilohertz.

4. The stepper motor controller of claim 1, wherein the stepper motor control signal comprises a pulse-width modulation (PWM) signal.

5. The stepper motor controller of claim 1, wherein the expected waveform comprises a target current value, and wherein the stepper motor control signal is configured to hold a position of a rotor of the stepper motor.

6. The stepper motor controller of claim 1, wherein the expected waveform comprises a sinusoidal wave, and wherein the stepper motor control signal is configured to rotate a position of a rotor of the stepper motor.

7. A stepper motor controller system adapted to be coupled to a stepper motor and comprising:
   a controller adapted to be coupled to the stepper motor, a voltage sensor, and a current sensor and configured to generate a control signal for the stepper motor based on a first error signal and a second error signal, the first error signal produced from a voltage measurement received from the voltage sensor and the second error signal, and the second error signal produced from a first voltage and a second voltage the first voltage is produced from an instantaneous current from the current sensor and the second voltage is produced from a stepper motor requirement; and a driver coupled to the controller and the stepper motor, and configured to control a voltage applied to the stepper motor based on the control signal.

8. The stepper motor system of claim 7, wherein the stepper motor comprises a stator coil, wherein the voltage sensor is configured to measure a voltage applied to the stator coil, and wherein the current sensor is configured to measure a current drawn by the stator coil.

9. The stepper motor system of claim 7, wherein the voltage sensor comprises a voltmeter connected in parallel across the stepper motor, and wherein the current sensor comprises an ammeter connected in series between the driver and the stepper motor.

10. The stepper motor system of claim 7, wherein the stepper motor comprises a unipolar stepper motor having a single pair of poles.

11. The stepper motor system of claim 7, wherein the stepper motor comprises a bipolar stepper motor having two pairs of poles.

12. The stepper motor system of claim 7, wherein the driver comprises an integrated driver having logic, a gate driver, protection and current control circuitry, and metal-oxide-semiconductor field-effect transistors (MOSFETs) integrated into one device.

13. The stepper motor system of claim 7, wherein the driver comprises a combination of a pre-driver and a metal-oxide-semiconductor field-effect transistor (MOSFET) circuit, wherein the pre-driver comprises logic, a gate driver, and protection and current control circuitry, and wherein the MOSFET circuit comprises MOSFETs.

14. A stepper motor controller, comprising:

a function generator configured to generate a sawtooth function signal; and a comparator coupled to the function generator and configured to:

receive the sawtooth function signal;

receive a first error signal produced from a voltage measurement and a second error signal, the second error signal produced from a first voltage and a second voltage, the first voltage is produced from an instantaneous current and the second voltage is produced from a stepper motor requirement;

compare the sawtooth function signal and the first error signal;

generate a pulse-width modulation (PWM) signal based on comparing the sawtooth function signal and the first error signal; and driving a stepper motor driver using the PWM signal.

15. The stepper motor controller of claim 14, wherein a frequency of the sawtooth function signal is greater than 20 kilohertz.

16. The stepper motor controller of claim 14, further comprising one or more filters configured to process the first error signal, and the voltage measurement to produce the first error signal is received from a voltage sensor adapted to be coupled to the stepper motor.

17. The stepper motor controller of claim 16, wherein the one or more filters comprise a Pi filter.

18. The stepper motor controller of claim 14, further comprising a current to voltage converter coupled to a current sensor and configured to generate the first voltage responsive to the instantaneous current measurement from the current sensor adapted to be coupled to the stepper motor.

19. The stepper motor controller of claim 18, wherein the current to voltage converter comprises a transimpedance amplifier that converts the current measurement to the first voltage using one or more operational amplifiers.

20. The stepper motor controller of claim 14, further comprising a digital-to-analog converter (DAC) configured to generate the second voltage responsive to the stepper motor requirement.

* * * * *